United States Patent
Amagata (10) Patent No.: US 9,764,414 B2
(45) Date of Patent: Sep. 19, 2017

(54) SPOT WELDING SYSTEM AND SPOT WELDING METHOD

(71) Applicant: FANUC Corporation, Yamanashi (JP)

(72) Inventor: Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/712,310

(22) Filed: May 14, 2015

(65) Prior Publication Data

US 2015/0336201 A1 Nov. 26, 2015

(30) Foreign Application Priority Data

May 21, 2014 (JP) .................................. 2014-105686

(51) Int. Cl.
| | |
|---|---|
| *B23K 11/31* | (2006.01) |
| *B23K 11/24* | (2006.01) |
| *B23K 11/11* | (2006.01) |
| *B23K 11/25* | (2006.01) |

(52) U.S. Cl.
CPC ........... *B23K 11/314* (2013.01); *B23K 11/115* (2013.01); *B23K 11/24* (2013.01); *B23K 11/25* (2013.01); *B23K 11/252* (2013.01); *B23K 11/253* (2013.01); *B23K 11/315* (2013.01)

(58) Field of Classification Search
CPC ... B23K 11/314; B23K 11/315; B23K 11/252; B23K 11/253; B23K 11/24; B23K 11/25; B23K 11/115
USPC ....................................................... 219/86.51
See application file for complete search history.

(56) References Cited

U.S. PATENT DOCUMENTS

| | | | | |
|---|---|---|---|---|
| 6,274,840 B1* | 8/2001 | Kanjo | .................. | B23K 11/253 219/86.41 |
| 2001/0045413 A1* | 11/2001 | Suita | ...................... | B23K 11/10 219/86.51 |
| 2014/0054272 A1* | 2/2014 | Kimoto | ................ | B23K 11/255 219/86.51 |

FOREIGN PATENT DOCUMENTS

| | | |
|---|---|---|
| JP | 6-155036 A | 6/1994 |
| JP | 8-206846 A | 8/1996 |
| JP | 11-10353 A | 1/1999 |
| JP | 11-285849 A | 10/1999 |
| JP | 2001-105153 A | 4/2001 |
| JP | 2009-56480 A | 3/2009 |
| JP | 2009-106986 A | 5/2009 |

(Continued)

*Primary Examiner* — Quang D Thanh
*Assistant Examiner* — James Sims, III
(74) *Attorney, Agent, or Firm* — Hauptman Ham, LLP (57) ABSTRACT

A spot welding system includes a position detection part which detects the position of a movable arm, a first calculation part which calculates the combined spring constant of the movable arm and a fixed arm based on a position when the movable arm is driven by a predetermined drive force and the drive force, a second calculation part which calculates the spring constant of the movable arm based on a position when the movable arm is driven by a predetermined drive force and the drive force, a third calculation part which calculates the spring constant of the fixed arm based on the combined spring constant and the spring constant of the movable arm, and an elastic displacement calculation part which calculates an amount of elastic displacement of the fixed arm based on the spring constant of the fixed arm and a drive force when welding is performed.

8 Claims, 7 Drawing Sheets

(56) References Cited

FOREIGN PATENT DOCUMENTS

JP        2014-42931  A    3/2014

\* cited by examiner

SPOT WELDING SYSTEM AND SPOT WELDING METHOD

RELATED APPLICATIONS

The present application claims priority of Japanese Application Number 2014-105686, filed May 21, 2014, the disclosure of which is hereby incorporated by reference herein in its entirety.

BACKGROUND ART

1. Technical Field

The invention relates to a spot welding system and a spot welding method.

2. Description of Related Art

In a spot welding gun in which a workpiece to be welded is held between a movable electrode tip and a fixed electrode tip to be welded, when the workpiece to be welded is pressed between the movable electrode tip and the fixed electrode tip, a gun arm which supports the movable electrode tip and the fixed electrode tip is elastically displaced. Due to such elastic displacement of the gun arm, deterioration, etc., in welding accuracy may occur.

Conventionally, a technique of estimating an elastic displacement of a gun arm during pressing of a workpiece to be welded by recording the relationship between a pressing force applied to the workpiece to be welded and the amount of elastic displacement of the gun arm as a reference data in advance and by basing on the reference data is known (see, for example, Japanese Patent Publication No. 06-155036 and Japanese Patent Publication No. 08-206846.

The degree of elastic displacement of a gun arm differs from one gun arm to another. In a conventional system, when estimating the amount of elastic displacement of a gun arm by evenly applying a reference data, it is not possible to accurately calculate the amount of elastic displacement for individual gun arms. Further, in a conventional system, a troublesome work will be necessary when trying to obtain reference data for each gun arm before welding in order to improve accuracy of the amount of elastic displacement to be calculated.

SUMMARY OF INVENTION

In one aspect of the invention, a spot welding system comprises a spot welding gun including a base (32); a fixed arm (34) fixed to the base; a fixed electrode tip (44) supported by the fixed arm; a movable arm (36) provided at the base so as to be movable relative to the fixed arm; a movable electrode tip (48) supported by the movable arm and holding a workpiece to be welded between the movable electrode tip and the fixed electrode tip; and a drive part which drives the movable arm.

A spot welding system comprises a position detection part which detects a position of the movable arm; a first spring constant calculation part which calculates a combined spring constant of the movable arm and the fixed arm, based on the position of the movable arm when the drive part drives the movable arm by a predetermined drive force so as to press the movable electrode tip against the fixed electrode tip, and on the drive force; a second spring constant calculation part which calculates a spring constant of the movable arm, based on the position of the movable arm when the drive part drives the movable arm by a predetermined drive force so as to press the movable electrode tip against a reference fixed object provided separate from the spot welding gun, and on the drive force.

A spot welding system comprises a third spring constant calculation part which calculates a spring constant of the fixed arm based on the combined spring constant and on the spring constant of the movable arm; and an elastic displacement calculation part which calculates an amount of elastic displacement of the fixed arm when the workpiece to be welded is held between the movable electrode tip and the fixed electrode tip, based on the spring constant of the fixed arm, and on a drive force applied to the movable arm from the drive part when the workpiece to be welded is held between the movable electrode tip and the fixed electrode tip.

The drive part may be a servomotor. The position detection part may detect the position of the movable arm by measuring a rotational position of the servomotor. The first spring constant calculation part may calculate the combined spring constant, based on the first position when the movable arm is driven by a first drive force, and on a second position when the movable arm is driven by a second drive force.

The first drive force may be substantially zero. The movable electrode tip may contact the fixed electrode tip without applying a pressure on the fixed electrode tip when the movable arm is arranged at the first position. The second spring constant calculation part may calculate the spring constant of the movable arm, based on a third position when the movable arm is driven by a third drive force, and on a fourth position when the movable arm is driven by a fourth drive force.

The third drive force may be substantially zero. The movable electrode tip may contact the reference fixed object without applying a pressure on the reference fixed object when the movable arm is arranged on the third position. The spot welding system may further comprise a manipulator to which the spot welding gun can be attached. The second spring constant calculation part may calculate the spring constant of the movable arm with taking a spring constant of the manipulator into consideration.

In another aspect of the invention, a spot welding method comprises a first pressing step of driving a movable arm of a spot welding gun by a predetermined drive force, and pressing a movable electrode tip supported by the movable arm against a fixed electrode tip supported by a fixed arm of the spot welding gun; a first position detection step of detecting a position of the movable arm at the first pressing step; and a first spring constant calculation step of calculating a combined spring constant of the movable arm and the fixed arm, based on the position detected at the first position detection step, and on the drive force applied to the movable arm at the first pressing step.

The spot welding method comprises a second pressing step of driving the movable arm by a predetermined drive force, and pressing the movable electrode tip against a reference fixed object provided to be separate from the spot welding gun; a second position detection step of detecting a position of the movable arm at the second pressing step; and a second spring constant calculation step of calculating a spring constant of the movable arm, based on the position detected at the second position detection step, and on the drive force applied to the movable arm at the second pressing step.

The spot welding method comprises a third spring constant calculation step of calculating a spring constant of the fixed arm based on the combined spring constant and on the spring constant of the movable arm; and a workpiece holding step of driving the movable arm by a predetermined drive force, and holding a workpiece to be welded between the movable electrode tip and the fixed electrode tip.

The spot welding method comprises a displacement calculation step of calculating an amount of elastic displacement of the fixed arm generated at the workpiece holding step, based on the spring constant of the fixed arm, and on the drive force applied to the movable arm at the workpiece holding step; and a position correction step of operating a manipulator to which the spot welding gun is attached, and correcting a position of the spot welding gun based on the amount of elastic displacement.

BRIEF DESCRIPTION OF DRAWINGS

The above-mentioned objects or other objects, features, and advantages of the invention will become more apparent by describing the following preferred embodiments referring to the attached drawings, in which.

DETAILED DESCRIPTION

Figure 1:
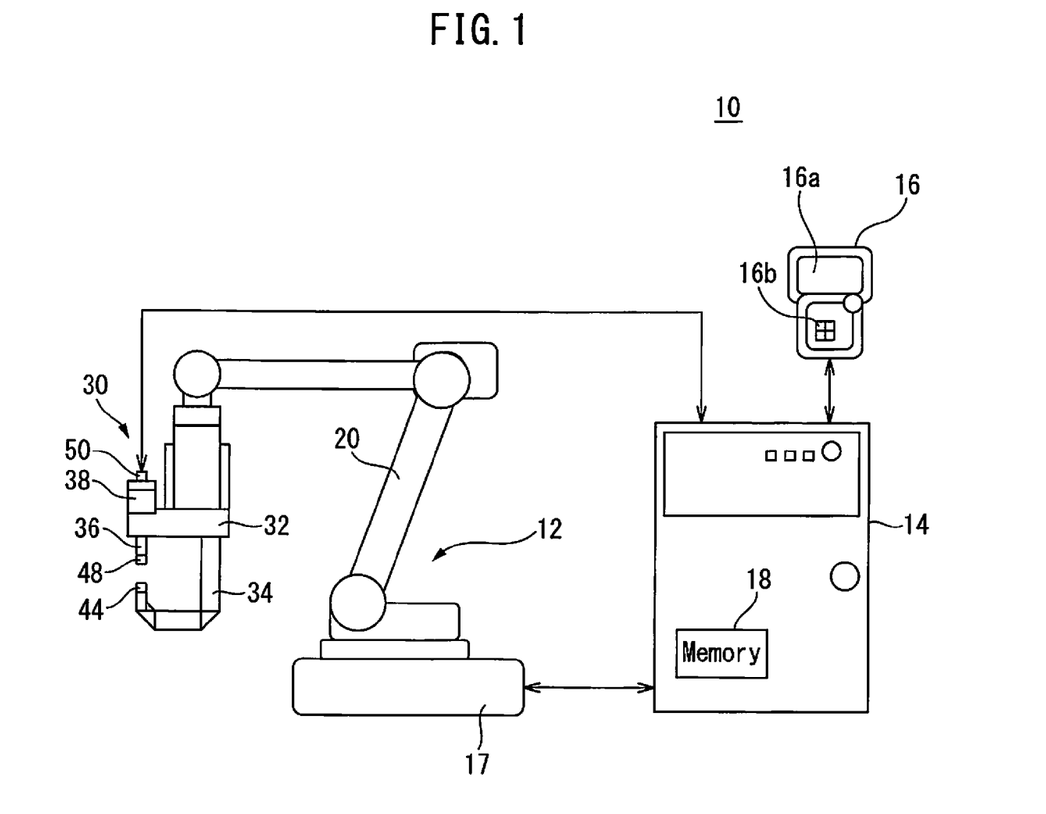
FIG. 1 is a schematic diagram of a spot welding system according to an embodiment of the invention.
Figure 2:
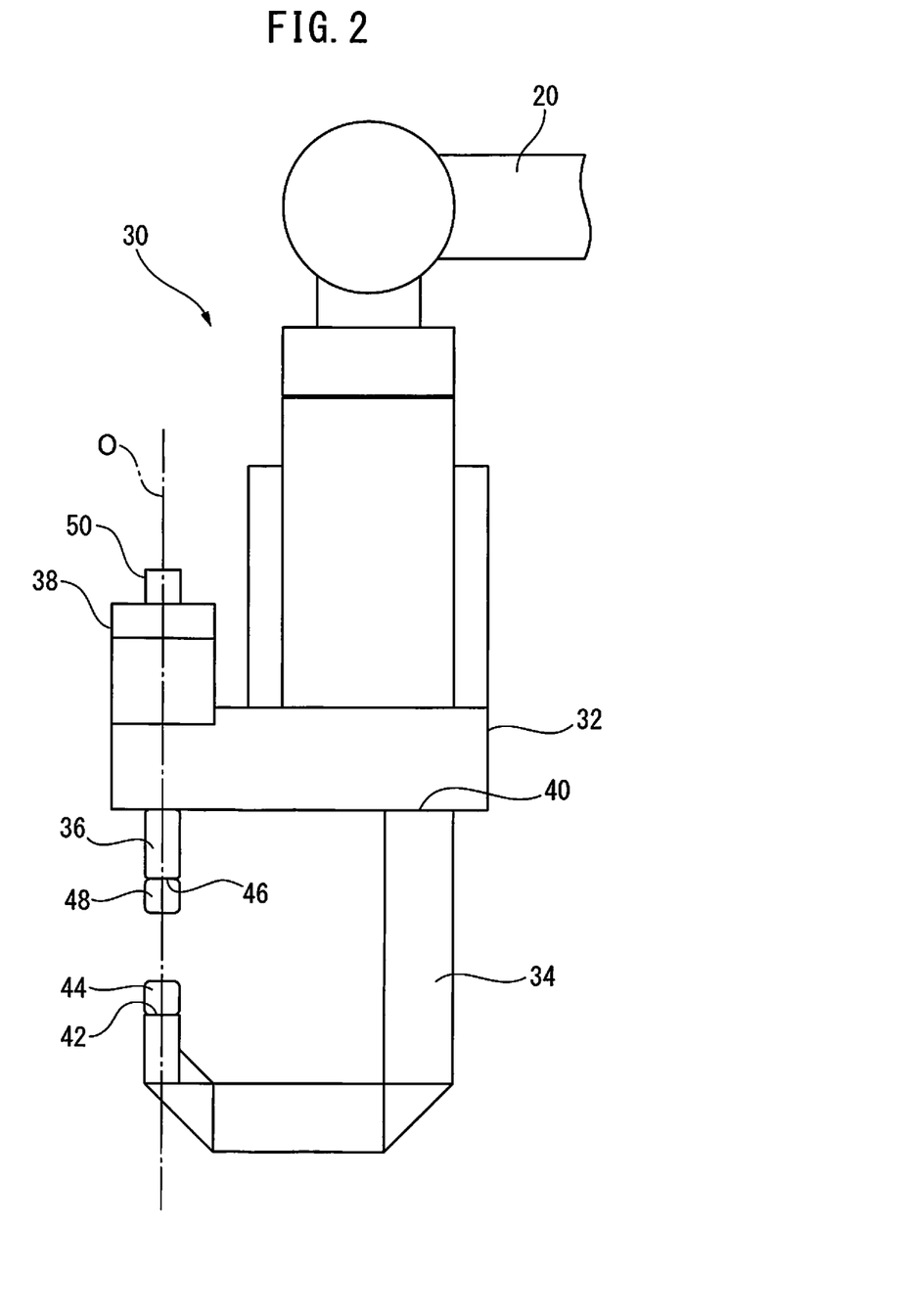
FIG. 2 is an enlarged view of the spot welding gun illustrated in FIG. 1.
Figure 3:
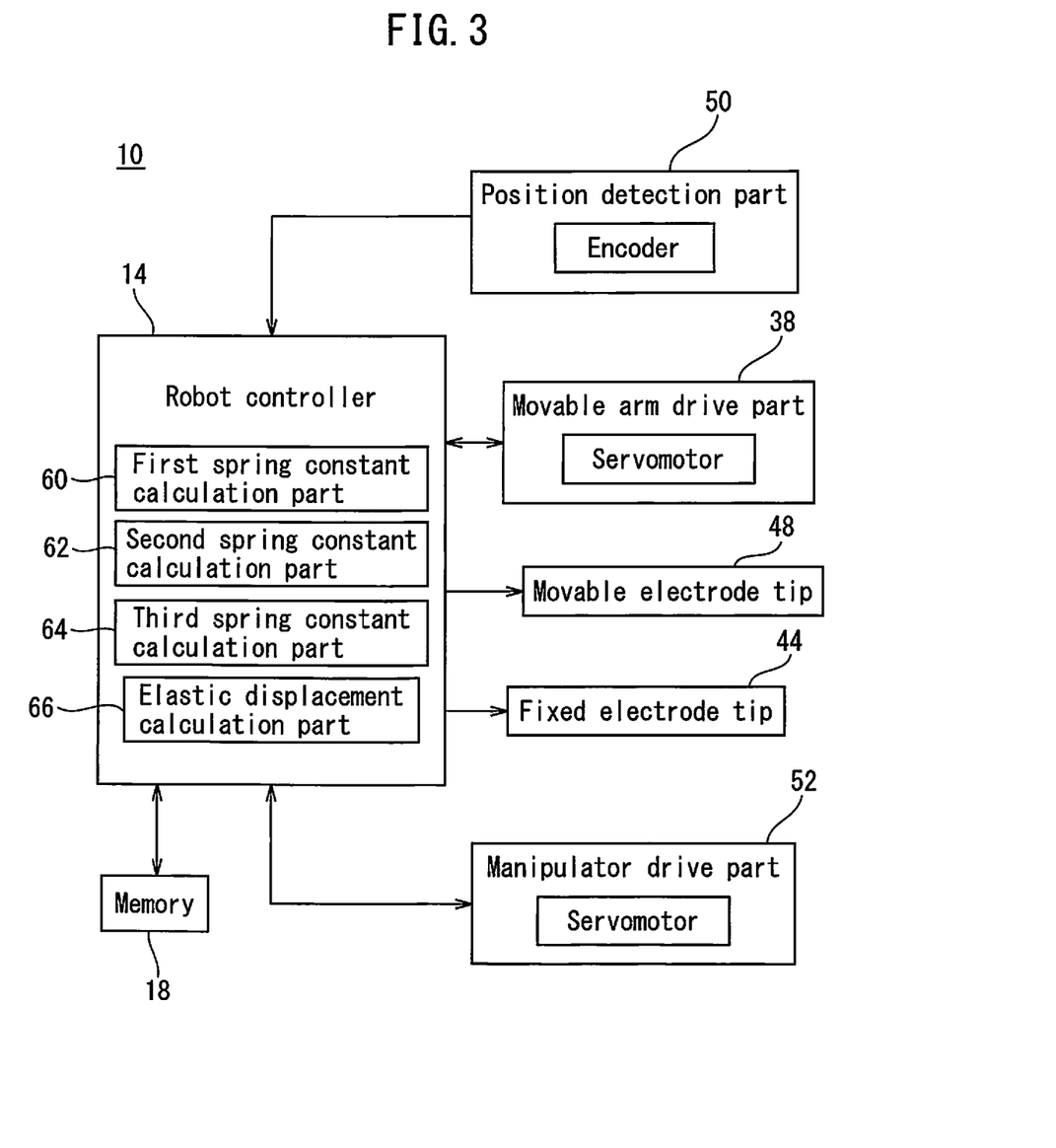
FIG. 3 is a block diagram of the spot welding system illustrated in FIG. 1.

Embodiments of the invention will be described in detail based on the Drawings. Referring to FIGS. 1 to 3, a spot welding system 10 according to an embodiment of the invention will be described. As illustrated in FIG. 1, the spot welding system 10 includes a robot 12, a robot controller 14, a teaching operation panel 16, a memory 18, and a spot welding gun 30.

The robot 12 is e.g. a vertical articulated robot, and includes a base 17 fixed to a floor, and a robot arm (manipulator) 20 rotatably connected to the base 17. The spot welding gun 30 is provided at the distal end of the robot arm 20, and is moved by the robot arm 20. The robot controller 14 controls each element of the robot 12 and the spot welding gun 30.

The memory 18 is communicably connected to the robot controller 14. The memory 18 is e.g. an electrically erasable or recordable nonvolatile memory, which is comprised of an EEPROM (registered trademark) etc. The memory 18 records a constant, a variable, a set value, or a program such as a robot program used for operating the robot 12, etc., which is required for operation of the spot welding system 10.

As illustrated in FIG. 2, the spot welding gun 30 includes a base 32, a fixed arm 34, a movable arm 36, and a servomotor 38. The fixed arm 34 is fixed to the base 32 at the proximal end 40 thereof, and supports a fixed electrode tip 44 at the distal end 42 thereof. In the present embodiment, the fixed arm 34 extends from the proximal end 40 to the distal end 42 so as to curve in a substantially L-shape.

The movable arm 36 is provided at the base 32 so as to be movable along a gun axis O. In the present embodiment, the movable arm 36 is a rod member extending linearly, whose upper end (not illustrated) is mechanically connected to an output shaft (not illustrated) of the servomotor 38 via a motion conversion mechanism (not illustrated), and whose lower end 46 supports a movable electrode tip 48.

The power conversion mechanism includes e.g. a timing belt and a pulley, and converts a rotational movement of the output shaft of the servomotor 38 into a reciprocating motion along the gun axis O. The movable arm 36 is reciprocated by the servomotor 38 along the gun axis O via the power conversion mechanism. The fixed electrode tip 44 and the movable electrode tip 48 are positioned on the gun axis O.

The fixed electrode tip 44 and the movable electrode tip 48 are energized in response to a command from the robot controller 14. Due to this, the fixed electrode tip 44 and the movable electrode tip 48 can perform spot welding on a workpiece to be welded which is held between the fixed electrode tip 44 and the movable electrode tip 48.

The movable electrode tip 48 reciprocates along the gun axis O in a direction toward the fixed electrode tip 44 and a direction away from the fixed electrode tip 44, as the movable arm 36 is driven by the servomotor 38. The servomotor 38 drives the movable arm 36 via the power conversion mechanism in response to a command from the robot controller 14.

An encoder 50 is attached to the servomotor 38. The encoder 50 detects the rotational position of the servomotor 38 and transmits it to the robot controller 14. The encoder 50 functions as a position detection part which detects the position of the movable arm 36 by detecting the rotational position of the servomotor 38. The position detection part may be comprised of a Hall element, instead of the encoder 50.

The robot controller 14 controls a servomotor 52 built in the robot arm 20, and operates the robot arm 20 via the servomotor 52. The servomotor 52 functions as a manipulator drive part (FIG. 3) which drives the robot arm (manipulator) 20. The robot controller 14 moves the spot welding gun 30 to a predetermined position by operating the robot arm 20.

A teaching operation panel 16 is communicably connected to the robot controller 14. A variety of information from the robot controller 14 is displayed on a display 16a of the teaching operation panel 16, and a user can browse such information through the display 16a. The user can perform a variety of operations and settings of the robot controller 14 via an input unit 16b (keyboard) of the teaching operation panel 16.

Next, referring to FIGS. 1 to 5, the operation of the spot welding system 10 will be described. The spot welding system 10 is for performing spot welding on a workpiece (not illustrated) to be welded by holding the workpiece between the fixed electrode tip 44 and the movable electrode tip 48 of the spot welding gun 30.

In the present embodiment, the spot welding system 10 calculates a combined spring constant of the movable arm 36 and the fixed arm 34 before performing spot welding on the workpiece. Specifically, in a state where a workpiece to be welded is not arranged between the fixed electrode tip 44 and the movable electrode tip 48, the robot controller 14 transmits a first torque command value to the servomotor 38 in order to drive the servomotor 38 with a predetermined first torque $\tau 1$.

Figure 4:
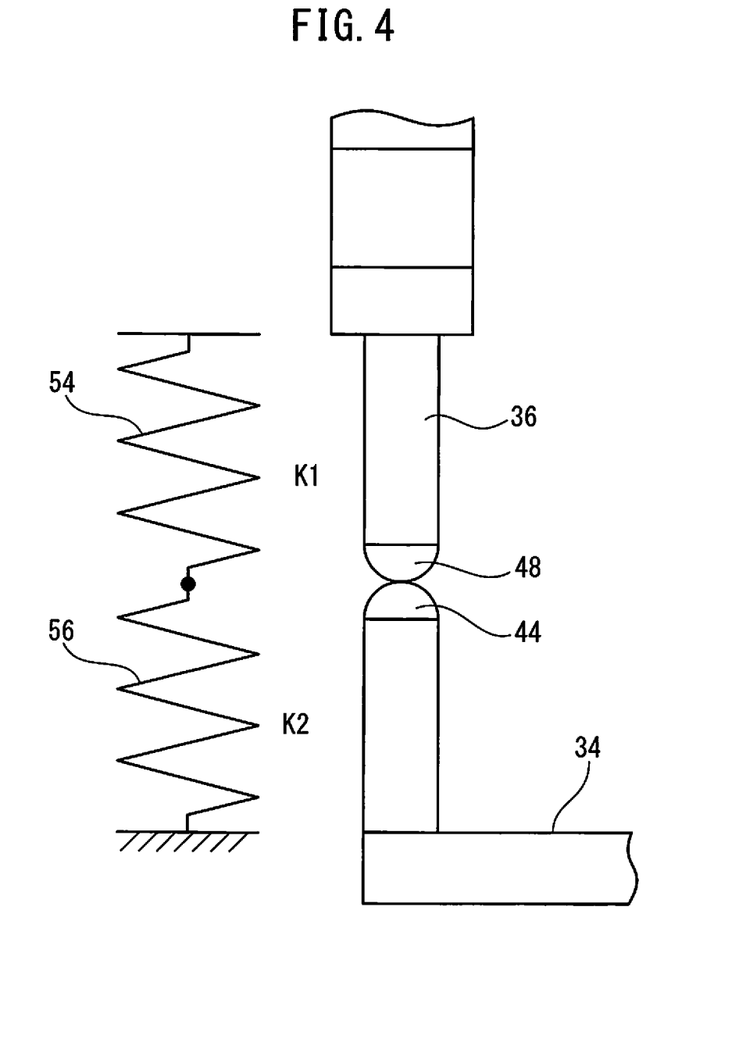
FIG. 4 is a schematic diagram illustrating a contact state of the movable arm and the fixed arm when calculating the combined spring constant of the movable arm and the fixed arm, along with an equivalent mechanical model of the movable arm and the fixed arm.

The servomotor 38 moves the movable arm 36 toward the fixed electrode tip 44 in response to the first torque command value. Then, as shown in FIG. 4, the movable electrode tip 48 and the fixed electrode tip 44 contact each other, and the movable arm 36 stops when a load torque larger than the first torque $\tau 1$ is applied to the servomotor 38. In this state, the encoder 50 measures a rotational position R1 of the servomotor 38 and transmits it to the robot controller 14. The robot controller 14 records the rotational position R1 in a memory 18.

In one example, the first torque $\tau 1$ is set to substantially zero (i.e., $\tau 1 \approx 0$). Here, a torque which is "substantially zero" refers to a torque which is small enough to be ignored when compared with a working torque applied to the movable arm 36 when holding the workpiece between the fixed electrode tip 44 and the movable electrode tip 48 during spot welding (e.g., 1% of the working torque or less).

In this case, the movable electrode tip 48 is in contact with the fixed electrode tip 44 without substantially applying a pressure on the fixed electrode tip 44. The rotational position R1 detected in this state is data representing a reference contact position where the movable electrode tip 48 and the fixed electrode tip 44 are in contact with each other without any pressure. Thus, by setting the first torque $\tau 1$ substantially zero, the reference contact position between the movable electrode tip 48 and the fixed electrode tip 44 can be detected.

In another example, the first torque $\tau 1$ may be set to a torque larger than zero (i.e., $\tau 1 > 0$). In this case, the movable electrode tip 48 contacts the fixed electrode tip 44 with being pressed against the fixed electrode tip 44 by a pressing force corresponding to the first torque $\tau 1$. The rotational position R1 which is detected in this state is data representing the position of the movable arm 36 when the movable electrode tip 48 and the fixed electrode tip 44 contact each other with a pressing force corresponding to the first torque $\tau 1$.

Next, the robot controller 14 transmits a second torque command value to the servomotor 38 in order to drive the servomotor 38 with a predetermined second torque $\tau 2$. In the present embodiment, the second torque $\tau 2$ is set to be larger than the first torque $\tau 1$. The servomotor 38 further moves the movable arm 36 toward the fixed electrode tip 44 in response to the second torque command value.

Then, the movable arm 36 is further displaced toward the fixed electrode tip 44 until a load torque larger than the second torque $\tau 2$ is applied to the servomotor 38, and then the movable electrode tip 48 presses the fixed electrode tip 44 by a pressing force corresponding to the second torque $\tau 2$. In this state, the encoder 50 measures a rotational position R2 of the servomotor 38, and transmits it to the robot controller 14. The robot controller 14 records the rotational position R2 in a memory 18.

Next, the robot controller 14 calculates a difference $\Delta_{R12}$ between the rotational positions R1 and R2 and a difference $\Delta_{\tau 12}$ between the first torque $\tau 1$ and the second torque $\tau 2$. Then, the robot controller 14 calculates a value K12 in accordance with the following formula 1 based on the Hooke's law.

$$K12 = \Delta_{\tau 12} / \Delta_{R12} \qquad \text{(formula 1)}$$

Here, the value K12 can be regarded as the combined spring constant of the movable arm 36 and the fixed arm 34. This will be briefly described in the following. As shown in FIG. 4, the differences $\Delta_{R12}$ and $\Delta_{\tau 12}$ used for calculating the above value K12 are obtained by directly abutting and pressurizing the movable electrode tip 48 against the fixed electrode tip 44. At this time, the movable arm 36 and the fixed arm 34 are elastically deformed in response to the drive forces (i.e., torques $\tau 1$ and $\tau 2$) applied to the movable arm 36.

An equivalent mechanical model which represents the elastic deformation of the movable arm 36 and the fixed arm 34 in this state can be approximated by a series connection of a spring 54 corresponding to the movable arm 36 and a spring 56 corresponding to the fixed arm 34, as shown in the left part of FIG. 4. Here, the spring 54 is an elastic element having a spring constant K1 of the movable arm 36, and the spring 56 is an elastic element having a spring constant K2 of the fixed arm 34. In this case, the combined spring constant K12 is represented by the following formula 2.

$$K12 = (K1 \times K2)/(K1 + K2) \qquad \text{(formula 2)}$$

As mentioned above, the robot controller 14 can calculate the combined spring constant K12 of the movable arm 36 and the fixed arm 34 by approximating the movable arm 36 and the fixed arm 34 as the equivalent mechanical model as shown in FIG. 4 and assigning the obtained $\Delta_{R12}$ and $\Delta_{\tau 12}$ to the above formula 1. Thus, the robot controller 14 has a function of a first spring constant calculation part 60 (FIG. 3) which calculates the combined spring constant K12.

Next, the robot controller 14 calculates the spring constant K1 of the movable arm 36 by the following method. Specifically, the movable arm 36 is moved by the robot controller 14 to separate the movable electrode tip 48 from the fixed electrode tip 44, and then, the user places a reference fixed object 58 (FIG. 5) between the movable electrode tip 48 and the fixed electrode tip 44. The reference fixed object 58 is a member which is provided separate from the spot welding gun 30, and is fixed so as not to be displaced. In the present embodiment, the reference fixed object 58 has a top face 58a which is orthogonal to the gun axis O.

After placing the reference fixed object 58, the robot controller 14 transmits a third torque command value to the servomotor 38 in order to drive the servomotor 38 by a third torque $\tau 3$. The third torque $\tau 3$ may be the same as or different from the above-mentioned first torque $\tau 1$.

Figure 5:
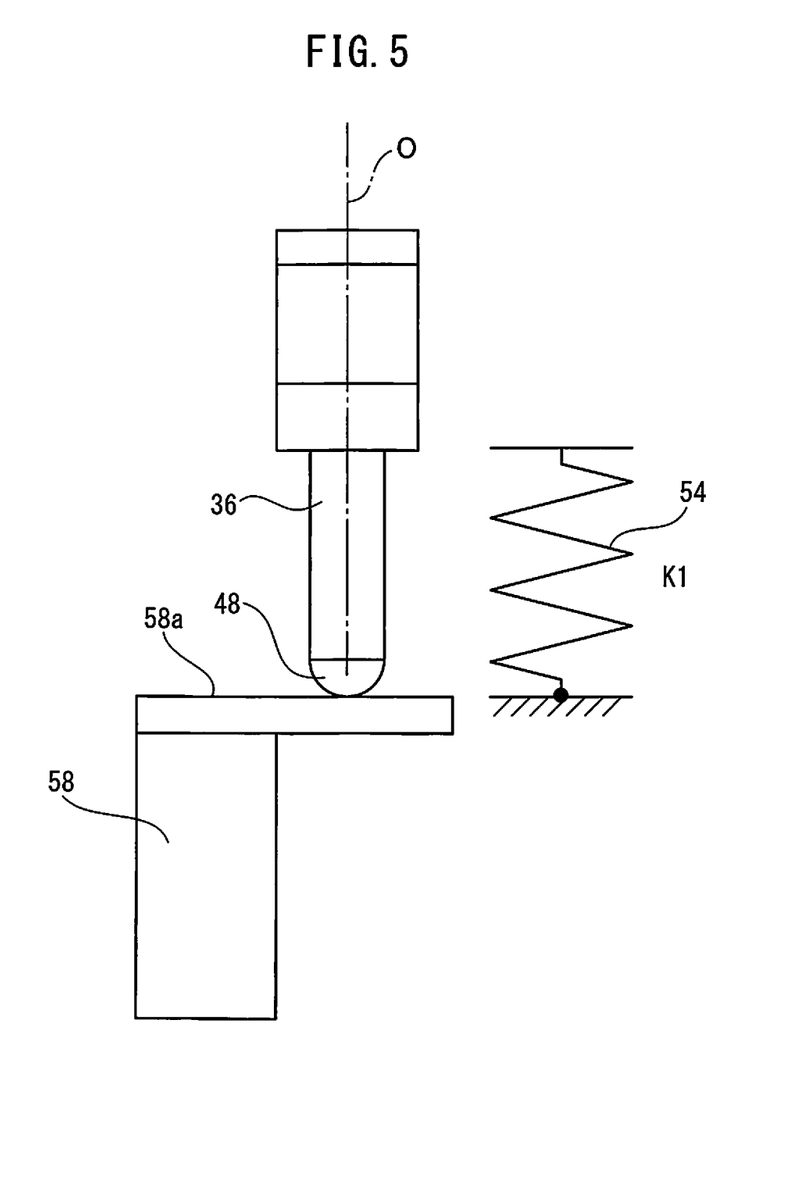
FIG. 5 is a schematic diagram illustrating a contact state of the movable arm and the reference fixed object when calculating the spring constant of the movable arm, along with an equivalent mechanical model of the movable arm.

The servomotor 38 moves the movable arm 36 toward the reference fixed object 58 in response to the third torque command value. Then, as shown in FIG. 5, the movable electrode tip 48 and the top face 58a of the reference fixed object 58 are in contact with each other, and the movable arm 36 stops when a load torque larger than the third torque $\tau 3$ is applied to the servomotor 38. In this state, the encoder 50 measures the rotational position R3 of the servomotor, and transmits it to the robot controller 14. The robot controller 14 records the rotational position R3 in the memory 18.

In one example, the third torque $\tau 3$ is set to substantially zero (i.e., $\tau 3 \approx 0$). In this case, the movable electrode tip 48 contacts the top face 58a of the reference fixed object 58 without substantially applying a pressure thereto. The rotational position R3 detected in this state is data representing a reference contact position where the movable electrode tip 48 and the top face 58a of the reference fixed object 58 are in contact with each other without any pressure.

Thus, by setting the third torque τ3 to substantially zero, the reference contact position of the movable electrode tip 48 and the top face 58a of the reference fixed object 58 can be detected. In another example, the third torque τ3 may be set to a torque larger than zero (i.e. τ3>0).

Next, the robot controller 14 transmits a fourth torque command value to the servomotor 38 in order to drive the servomotor 38 by a fourth torque τ4. In the present embodiment, the fourth torque τ4 is set to be larger than the third torque τ3. The servomotor 38 further moves the movable arm 36 toward the fixed electrode tip 44 in response to the fourth torque command value.

Then, the movable arm 36 is further displaced toward the reference fixed object 58 until a load torque larger than the fourth torque τ4 is applied to the servomotor 38, and then the movable electrode tip 48 presses the fixed electrode tip 44 by a pressing force corresponding to the fourth torque τ4. In this state, the encoder 50 measures a rotational position R4 of the servomotor, and transmits it to the robot controller 14. The robot controller 14 records the rotational position R4 in the memory 18.

Next, the robot controller 14 calculates a difference $\Delta_{R34}$ between the rotational positions R3 and R4 and a difference $\Delta_{\tau 34}$ between the third torque τ3 and the fourth torque τ4. Then, the robot controller 14 calculates a value K1 in accordance with the following formula 3.

$$K1=\Delta_{\tau 34}/\Delta_{R34} \quad \text{(formula 3)}$$

The thus calculated value K1 can be regarded as the spring constant of the movable arm 36. This will be briefly described in the following. As shown in FIG. 5, the differences $\Delta_{R34}$ and $\Delta_{\tau 34}$ used for calculating the value K1 are obtained by pressing the movable electrode tip 48 against the reference fixed object 58.

As mentioned above, since the reference fixed object 58 is fixed so as not to be displaced, only the movable arm 36 can elastically deform in response to the drive forces (i.e., torques τ3 and τ4) applied to the movable arm 36, when the movable electrode tip 48 is pressed against the reference fixed object 58. An equivalent mechanical model which represents the elastic deformation of the movable arm 36 in this case can be approximated by the spring 54 corresponding to the movable arm 36, as shown in the right part of FIG. 5. Therefore, the value K1 obtained from the above formula 3 can be regarded as the spring constant K1 of the movable arm 36.

As mentioned above, in the present embodiment, the robot controller 14 calculates the spring constant K1 of the movable arm 36 by the above-mentioned formula 3. Thus, the robot controller 14 has a function of a second spring constant calculation part 62 (FIG. 3) which calculates the spring constant K1 of the movable arm 36.

Next, the robot controller 14 calculates the spring constant K2 of the fixed arm 34 based on the combined spring constant K12 and the spring constant K1 of the movable arm 36 calculated as stated above. Specifically, the robot controller 14 assigns the combined spring constant K12 and the spring constant K1 to the above formula 2 to calculate the spring constant K2 of the fixed arm 34. Thus, in the present embodiment, the robot controller 14 has a function of a third spring constant calculation part 64 (FIG. 3) which calculates the spring constant K2 of the fixed arm 34.

After calculating the spring constant K2 of the fixed arm 34, the spot welding system 10 starts spot welding on the workpiece. First, the robot controller 14 sends a command to the servomotor 52 in accordance with a robot program so as to operate the robot arm 20, and moves the spot welding gun 30 to a predetermined working position. The robot program is pre-recorded in the memory 18, and includes an operation command for the servomotor 52 in order to move the spot welding gun 30 to the predetermined working position.

After positioning the spot welding gun 30 at the working position, the user places the workpiece between the movable electrode tip 48 and the fixed electrode tip 44. Subsequently, the robot controller 14 sends a fifth torque command value to the servomotor 38 in order to move the movable arm 36 by a fifth torque τ5 as the working torque. The servomotor 38 moves the movable arm 36 toward the fixed electrode tip 44 in response to the fifth torque command value. As the result, the workpiece is held between the movable electrode tip 48 and the fixed electrode tip 44 by a pressing force corresponding to the fifth torque τ5.

Next, the robot controller 14 calculates an amount of elastic displacement δe generated at the fixed arm 34 when holding the workpiece between the movable electrode tip 48 and the fixed electrode tip 44, on the basis of the spring constant K2 of the fixed arm 34 and the fifth torque τ5 calculated as stated above. Specifically, the robot controller 14 assigns the spring constant K2 of the fixed arm 34 and the fifth torque τ5 to the following formula 4 to calculate the amount of elastic displacement δe.

$$\delta e=\tau 5/K2 \quad \text{(formula 4)}$$

Thus, in the present embodiment, the robot controller 14 has a function of an elastic displacement calculation part 66 which calculates the amount of elastic displacement δe of the fixed arm 34 when holding the workpiece between the movable electrode tip 48 and the fixed electrode tip 44.

Next, the robot controller 14 operates the robot arm 20 so as to correct the position of the spot welding gun 30 based on the amount of elastic displacement δe. Due to this, since the elastic displacement generated at the fixed arm 34 when holding the workpiece can be cancelled, the contact position between the movable electrode tip 48 and the fixed electrode tip 44 in the spot welding gun 30 can be maintained constant. In this state, the robot controller 14 energizes the movable electrode tip 48 and the fixed electrode tip 44 so as to perform spot welding on the workpiece to be welded.

In the present embodiment, the amount of elastic displacement δe when holding the workpiece can be calculated only by pressing the movable electrode tip 48 against the fixed electrode tip 44 and by pressing the movable electrode tip 48 against the reference fixed object 58 before spot welding. Due to such a configuration, the displacement of the position of the movable electrode tip 48 and the fixed electrode tip 44 when holding the workpiece can be automatically calculated. Therefore, it is possible to omit manual measurement of the above displacement of the position, whereby the number of working processes can be reduced.

Further, according to the present embodiment, it is possible to calculate the amount of elastic displacement δe regarding individual spot welding gun 30 before spot welding, and therefore it is possible to accurately calculate the amount of elastic displacement δe corresponding to individual spot welding gun 30. Therefore, the accuracy of spot welding can be improved.

Further, according to the present embodiment, the measurement of the spring constant K2 of the fixed arm 34, which has been considered to be difficult in a conventional art, can be executed frequently. Therefore, it is possible to deal with the change in the elastic displacement of the fixed arm 34 derived from aging degradation.

Further, in the present embodiment, the combined spring constant K12 is calculated by using a plurality of torques of different magnitudes (i.e., the first torque τ1 and the second torque τ2). Similarly, the spring constant K1 of the movable arm 36 is calculated by using a plurality of torques of different magnitudes (i.e., the third torque τ3 and the fourth torque τ4). Due to this configuration, it is possible to more accurately calculate the combined spring constant K12 and the spring constant K1.

Note that, the combined spring constant K12 and/or the spring constant K1 of the movable arm 36 may be calculated with only one torque. Such an embodiment will be described below. In this embodiment, a reference contact position where the movable electrode tip 48 and the fixed electrode tip 44 contact each other without involving a pressure is measured in advance, and a rotational position R0 of the servomotor 38 corresponding to the reference contact position is recorded in the memory 18 in advance.

When calculating the combined spring constant K12, the robot controller 14 transmits a sixth torque command value to the servomotor 38 in order to drive the servomotor 38 by a sixth torque τ6. The sixth torque τ6 is set to be larger than zero. The servomotor 38 moves the movable arm 36 in response to the sixth torque command value, whereby the movable electrode tip 48 presses the fixed electrode tip 44 by a force corresponding to the sixth torque τ6.

In this state, the encoder 50 measures the rotational position R6 of the servomotor 38, and records it in the memory 18. Then, the robot controller 14 assigns the difference $\Delta_{R06}$ between the pre-recorded rotational position R0 and the measured rotational position R6, and the sixth torque τ6 to the following formula 5 to calculate the combined spring constant K12.

$K12 = \tau 6 / \Delta_{R06}$ (formula 5)

Similarly, the robot controller 14 can calculate the spring constant K1 of the movable arm 36 from only one torque. Specifically, a reference contact position where the movable electrode tip 48 and the reference fixed object 58 contact each other without involving a pressure is measured in advance, and a rotational position R0' of the servomotor 38 corresponding to the reference contact position is recorded in the memory 18 in advance.

When calculating the spring constant K1 of the movable arm 36, the robot controller 14 drives the movable arm 36 by a seventh torque τ7 to press the movable electrode tip 48 against the reference fixed object 58. A rotational position R7 of the servomotor 38 at this time is detected. Then, the robot controller 14 assigns the difference $\Delta_{R07}$ between the recorded rotational position R0' and the detected rotational position R7, and the seventh torque τ7 to the following formula 6, thereby calculating the spring constant K1 of the movable arm 36.

$K1 = \tau 7 / \Delta_{R07}$ (formula 6)

In the above-mentioned embodiment, the servomotor 38 is applied as a drive part for driving the movable arm 36, and the encoder 50 (or a Hall element) is applied as a position detection part for detecting the position of the movable arm 36. However, the invention should not be limited thereby. The drive part may include a device capable of driving the movable arm 36 linearly along the gun axis O, such as a linear motor or a cylinder. In this case, the position detection part may detect a displacement of the movable arm 36 along the gun axis O (e.g., the unit: [mm]).

In still another embodiment, the robot controller 14 may calculate the spring constant K1 of the movable arm 36, with taking the spring constant Kr of the robot arm 20 into consideration. Such an embodiment will be described below referring to FIG. 6. In this embodiment, the memory 18 pre-records the spring constant Kr of the robot arm 20. The spring constant Kr of the robot arm 20 can be calculated by the following method.

In one example, an object having a sufficiently high rigidity relative to robot arm 20 is attached to the robot arm 20, then the robot controller 14 operates the robot arm 20 to press the object against the reference fixed object. The robot controller 14 calculates the spring constant Kr of the robot arm 20 from the driving torque of the servomotor 52 at this time and the rotational position of the servomotor 52.

As an example of "an object having a sufficiently high rigidity relative to robot arm 20," the above spot welding gun 30 can be applied. Specifically, prior to the step of calculating the spring constant K1 of the movable arm 36, the robot controller 14 drives the servomotor 52 with a predetermined torque (for example, with two different torques) to press the spot welding gun 30 against the reference fixed object 58, with the spot welding gun 30 being attached to the robot arm 20. Then, the robot controller 14 detects the rotational position of the servomotor 52 via e.g. an encoder provided at the servomotor 52. Then, the robot controller 14 calculates the spring constant Kr of the robot arm 20 in accordance with a similar formula as the above formula 3, and records it in the memory 18.

Figure 6:
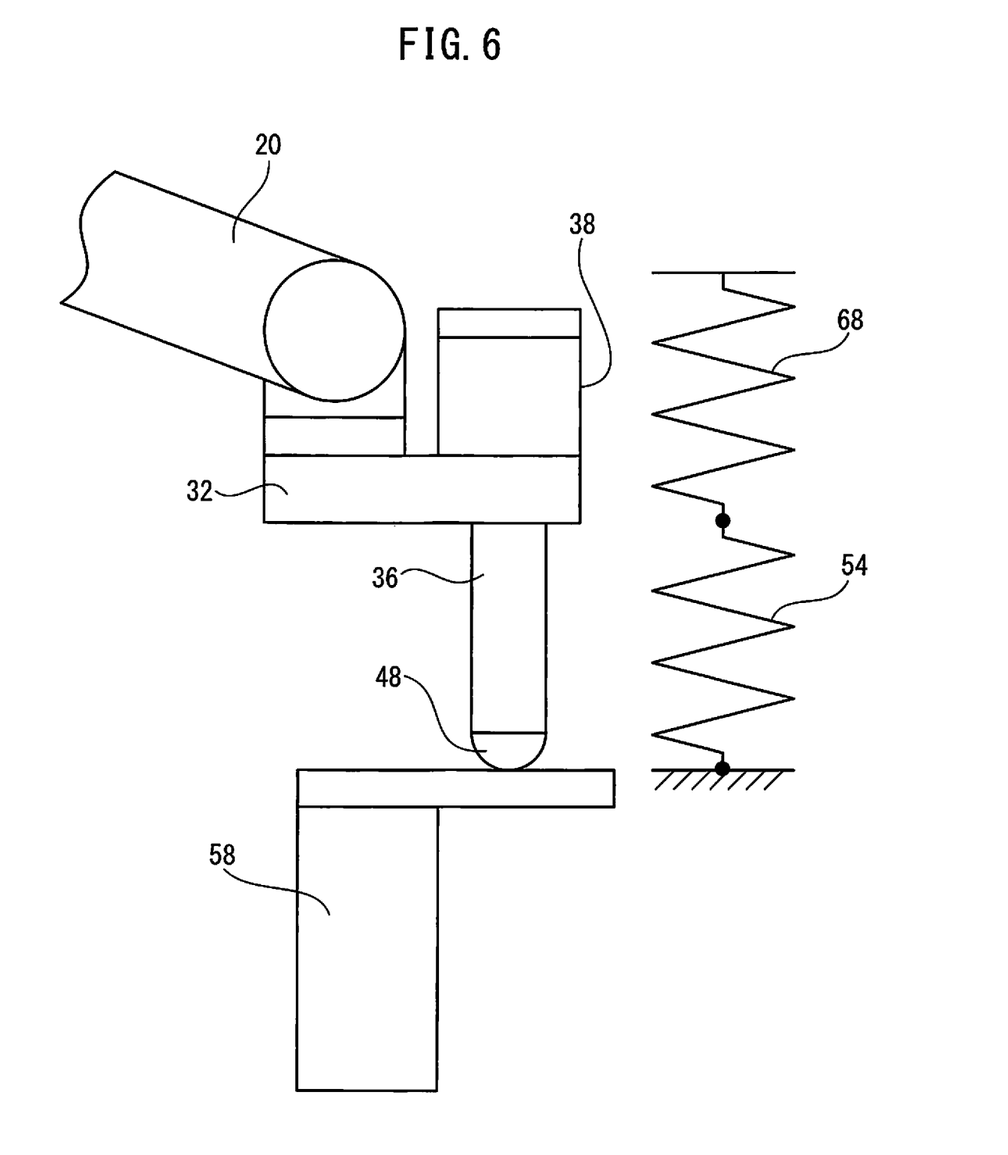
FIG. 6 is a schematic diagram illustrating a contact state of the movable arm and the reference fixed object when calculating the spring constant of the movable arm with taking the spring constant of the robot arm into consideration, along with an equivalent mechanical model of the robot arm and the movable arm.

FIG. 6 illustrates an equivalent mechanical model of the movable arm 36 and the robot arm 20, where the spring constant Kr of the robot arm 20 is taken into consideration. An equivalent mechanical model when pressing the movable electrode tip 48 against the reference fixed object 58 by the robot arm 20 can be approximated by a series connection of the spring 54 corresponding to the movable arm 36 and a spring 68 corresponding to the robot arm 20. In this case, the above formula 3 is replaced with the following formula 7.

$(K1 \times Kr)/(K1 + Kr) = \Delta_{\tau 34}/\Delta_{R34}$ (formula 7)

The robot controller 14 assigns the calculated $\Delta_{R34}$ and $\Delta_{\tau 34}$ and the pre-recorded spring constant Kr of the robot arm 20 to the above formula 7, whereby the spring constant K1 of the movable arm 36 can be calculated. Thus, by calculating the spring constant K1 of the movable arm 36 with taking the spring constant Kr of the robot arm 20 into consideration, it is possible to more accurately calculate the spring constant K1.

Figure 7:
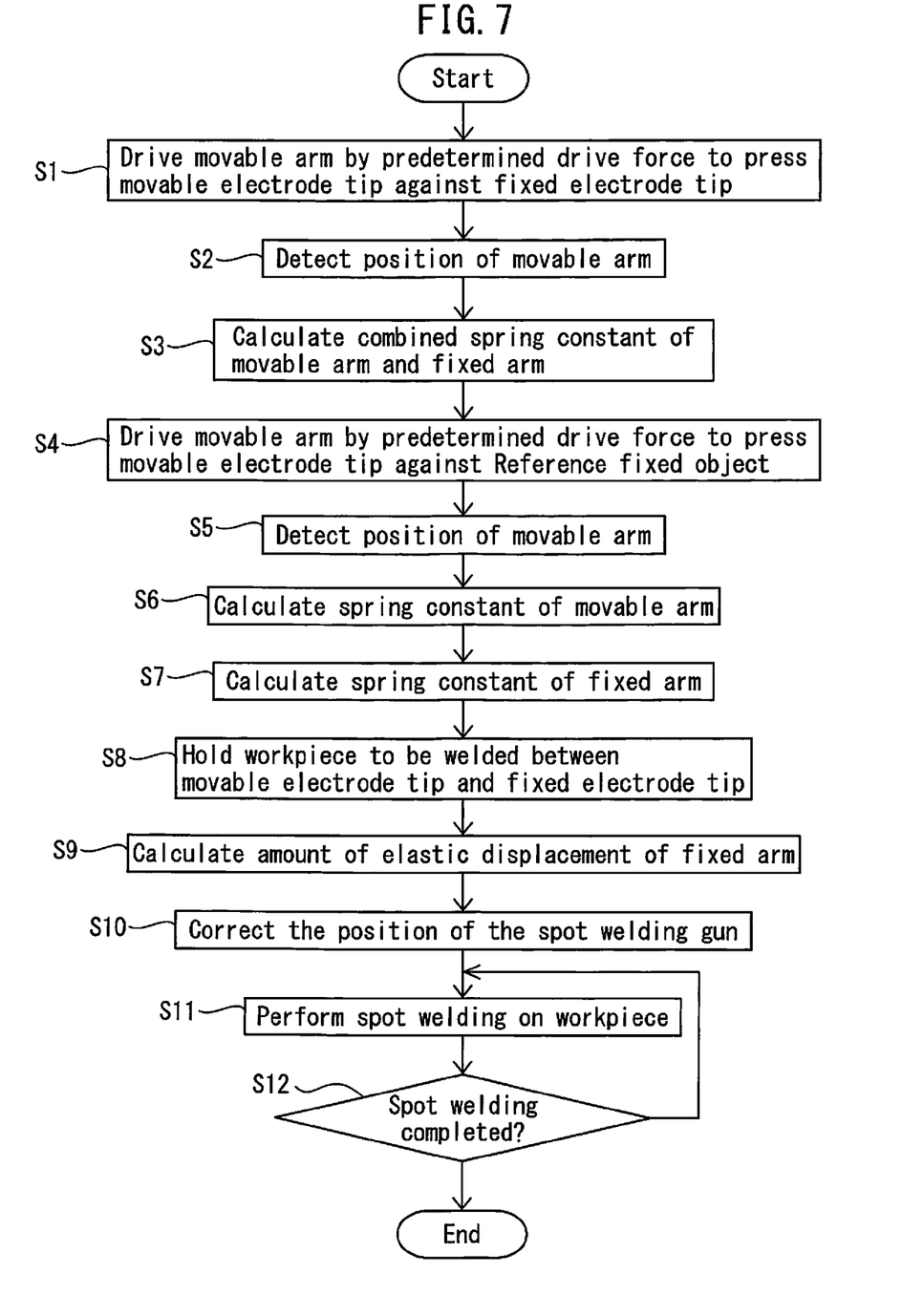
FIG. 7 is a flow chart of a spot welding method according to an embodiment of the invention.

Next, referring to FIG. 7, a spot welding method according to an embodiment of the invention will be described. At step S1, the robot controller 14 drives the movable arm 36 by a predetermined drive force so as to press the movable electrode tip 48 against the fixed electrode tip 44. In one example, at step S1, the robot controller 14 drives the movable arm 36 via the servomotor 38 by the first torque τ1 set to substantially zero. In another example, at step S1, the robot controller 14 drives the movable arm 36 via the servomotor 38 by the sixth torque τ6 (>0).

At step S2, the robot controller 14 detects the position of the movable arm 36. In one example, at step S2, the robot controller 14 measures the rotational position R1 of the servomotor 38 via the encoder 50 when driving the movable arm 36 by the first torque τ1. Subsequently, after step S2, the robot controller 14 returns to the step S1 again, and drives the movable arm 36 via the servomotor 38 by the second torque τ2 (>τ1).

Subsequently, at step S2, the robot controller 14 measures the rotational position R2 of the servomotor 38 when driving the movable arm 36 by the second torque τ2. In another example, at step S2, the robot controller 14 measures the rotational position R6 of the servomotor 38 via the encoder 50 when driving the movable arm 36 by the sixth torque $\tau 6$.

At step S3, the robot controller 14 calculates the combined spring constant K12 of the movable arm 36 and the fixed arm 34, based on the position of the movable arm 36 detected at step S2 and on the drive force applied to the movable arm 36 at step S1. In one example, the robot controller 14 calculates the difference $\Delta_{R12}$ between the rotational positions R1 and R2 obtained at step S2, and the difference $\Delta_{\tau 12}$ between the first torque $\tau 1$ and the second torque $\tau 2$ used at step S1. Then, the robot controller 14 calculates the combined spring constant K12 in accordance with the above formula 1.

In another example, at step S3, the robot controller 14 reads out the rotational position R0 of the servomotor 38, which corresponds to the reference contact position and which is pre-recorded in the memory 18. Then, the robot controller 14 calculates the difference $\Delta_{R06}$ between the rotational position R0 and the rotational position R6 obtained at step S2, and assigns the $\Delta_{R06}$ and the sixth torque $\tau 6$ to the above formula 5, whereby calculating the combined spring constant K12.

At step S4, the robot controller 14 drives the movable arm 36 by a predetermined drive force to press the movable electrode tip 48 against the reference fixed object 58. In one example, at step S4, the robot controller 14 drives the movable arm 36 via the servomotor 38 by the third torque $\tau 3$ set to substantially zero. In another example, at step S4, the robot controller 14 drives the movable arm 36 via the servomotor 38 by the seventh torque $\tau 7$ (>0).

At step S5, the robot controller 14 detects the position of the movable arm 36. In one example, the robot controller 14 measures the rotational position R3 of the servomotor 38 via the encoder 50 when driving the movable arm 36 by the third torque $\tau 3$. Subsequently, the robot controller 14 returns to step S4 again, and drives the movable arm 36 via the servomotor 38 by the fourth torque $\tau 4$ (>$\tau 3$).

Subsequently, at step S5, the robot controller 14 measures the rotational position R4 of the servomotor 38 when driving the movable arm 36 by the fourth torque $\tau 4$. In another example, at step S5, the robot controller 14 detects the rotational position R7 of the servomotor 38 when driving the movable arm 36 by the seventh torque $\tau 7$.

At step S6, the robot controller 14 calculates the spring constant K1 of the movable arm 36, based on the position of the movable arm 36 detected at step S5 and on the drive force applied to the movable arm 36 at step S4. In one example, the robot controller 14 calculates the difference $\Delta_{R34}$ between the rotational positions R3 and R4 obtained at step S4, and the difference $\Delta_{R34}$ between the third torque $\tau 3$ and the fourth torque $\tau 4$ used at step S4. Then, the robot controller 14 calculates the spring constant K1 of the movable arm 36 in accordance with the above formula 3.

In another example, at step S6, the robot controller 14 reads out the rotational position R0 of the servomotor 38 corresponding to the reference contact position pre-recorded in the memory 18. Then, the robot controller 14 calculates the difference $\Delta_{R07}$ between the rotational position R0 and the rotational position R7 obtained at step S5, and assigns the $\Delta_{R07}$ and the seventh torque $\tau 7$ to the above formula 1 to calculate the combined spring constant K12.

In still another example, at step S6, the robot controller 14 assigns the difference $\Delta_{R34}$ between the rotational positions R3 and R4 obtained at step S5, the difference $\Delta_{\tau 34}$ between the third torque $\tau 3$ and the fourth torque $\tau 4$ used at step S4, and the spring constant Kr of the robot arm 20 pre-recorded in the memory 18 to the above formula 7 to calculate the spring constant K1 of the movable arm 36. By this operation, the robot controller 14 calculates the spring constant K1 of the movable arm 36 with taking the spring constant Kr of the robot arm 20 into consideration.

At step S7, the robot controller 14 calculates the spring constant K2 of the fixed arm 34 based on the combined spring constant K12 and the spring constant K1 of the movable arm 36. Specifically, the robot controller 14 assigns the combined spring constant K12 calculated at step S3 and the spring constant K1 calculated at step S6 to the above formula 2 to calculate the spring constant K2 of the fixed arm 34.

At step S8, the robot controller 14 drives the movable arm 36 by a predetermined drive force so as to hold a workpiece to be welded between the movable electrode tip 48 and the fixed electrode tip 44. Specifically, the robot controller 14 drives the movable arm 36 via the servomotor 38 by the fifth torque $\tau 5$ as a working torque so as to hold the workpiece between the movable electrode tip 48 and the fixed electrode tip 44 with a pressing force corresponding to the fifth torque $\tau 5$.

At step S9, the robot controller 14 calculates the amount of elastic displacement $\delta e$ of the fixed arm 34 which is generated when holding the workpiece between the movable electrode tip 48 and the fixed electrode tip 44, based on the spring constant K2 of the fixed arm 34 and the drive force applied to the movable arm 36 at step S8. Specifically, the robot controller 14 assigns the spring constant K2 calculated at step S7 and the fifth torque $\tau 5$ used at step S8 to the above formula 4 to calculate the amount of elastic displacement $\delta e$.

At step S10, the robot controller 14 operates the robot arm 20 so as to correct the position of the spot welding gun 30 based on the amount of elastic displacement $\delta e$. At step S11, the robot controller 14 energizes the movable electrode tip 48 and the fixed electrode tip 44 to perform spot welding on the workpiece.

At step S12, the robot controller 14 determines whether the operation of spot welding on the workpiece has been appropriately completed or not. The robot controller 14 ends the flow shown in FIG. 7 when determining that the spot welding on the workpiece has been appropriately completed. On the other hand, the robot controller 14 returns to step S11 when determining that the spot welding on the workpiece has not been appropriately completed.

Note that, in the above-mentioned embodiment, the second torque $\tau 2$ is set to be larger than the first torque $\tau 1$. However, the invention should not be limited to this configuration. The second torque $\tau 2$ may be set to be smaller than the first torque $\tau 1$.

Further, in the above-mentioned embodiment, the movable arm 36 is provided at the base 32 so as to be movable along the gun axis O. However, the invention should not be limited to this configuration. The movable arm may be rotatably provided at the base 32. For example, the movable arm is rotated by the servomotor 38 about a rotation axis (for example, an axis orthogonal to the surface of FIG. 2) provided at the base 32.

The movable electrode tip 48 provided on this movable arm reciprocates along a circle about the rotation axis in a direction toward the fixed electrode tip 44 and a direction away from the fixed electrode tip 44, as the movable arm is rotated. In this case, the robot controller 14 can also calculate the combined spring constant K12 and the spring constant K1 of the movable arm, on the basis of the difference $\Delta_R$ of the rotational positions of the servomotor 38 and the difference $\Delta_\tau$ of the driving torques of the servomotor 38, similar to the above-mentioned embodiment.

The invention has been described above through the embodiments, which, however, do not intend to limit the scope of the invention set forth in the claims. A Combination of the features described in the embodiments may be within the technical scope of the invention. However, not all of the combinations of the features described in the embodiments intend to be essential for the features or means of the invention. Moreover, it would be obvious for a person skilled in the art to be able to modify or revise the embodiments described above. It would also be obvious from the description of the claims that any embodiments with such modification or revision would be included in the technical scope of the invention.

It should be noted that an execution procedure in each process including motions, procedures, steps, processes and stages in the devices, systems, programs and methods described in the claims, the description and the drawing do not specify "before" or "prior to", and thus they can be carried out in any desired order, unless a preceding output is used in a following process. As a matter of convenience, although terms such as "first," "next," and "then" may be used in any of the claims, the description and the operation flows in the drawing, they are not intended to specify any execution order.

The invention claimed is:

1. A spot welding system, comprising:
  a spot welding gun including:
    a base;
    a fixed arm fixed to the base;
    a fixed electrode tip supported by the fixed arm;
    a movable arm provided at the base and configured to move relative to the fixed arm;
    a movable electrode tip supported by the movable arm and holding a workpiece to be welded between the movable electrode tip and the fixed electrode tip; and
    a drive part configured to drive the movable arm;
  a position detection part configured to detect a position of the movable arm; and
  a controller comprising a processor, the processor being programmed to perform a spot welding method comprising:
    a first pressing step of controlling the drive part to drive the movable arm of the spot welding gun by a predetermined drive force for pressing the movable electrode tip supported by the movable arm against the fixed electrode tip supported by the fixed arm of the spot welding gun;
    a first position detection step of receiving, from the position detection part, a detected position of the movable arm at the first pressing step;
    a first spring constant calculation step of calculating a combined spring constant of the movable arm and the fixed arm, based on the detected position of the movable arm at the first position detection step, and on the drive force applied to the movable arm at the first pressing step;
    a second pressing step of controlling the drive part to drive the movable arm by a predetermined drive force for pressing the movable electrode tip against a reference fixed object provided separate from the spot welding gun;
    a second position detection step of receiving, from the position detection part, a detected position of the movable arm at the second pressing step;
    a second spring constant calculation step of calculating a spring constant of the movable arm, based on the detected position of the movable arm at the second position detection step, and on the drive force applied to the movable arm at the second pressing step;
    a third spring constant calculation step of calculating a spring constant of the fixed arm based on the combined spring constant and on the spring constant of the movable arm;
    a workpiece holding step of controlling the drive part to drive the movable arm by a predetermined drive force for holding the workpiece to be welded between the movable electrode tip and the fixed electrode tip;
    an elastic displacement calculation step of calculating an amount of elastic displacement of the fixed arm generated at the workpiece holding step, based on the spring constant of the fixed arm, and on a drive force applied to the movable arm at the workpiece holding step; and
    a position correction step of controlling a manipulator drive part to operate a manipulator, to which the spot welding gun is attached, for correcting a position of the spot welding gun based on the calculated amount of the elastic displacement of the fixed arm.

2. The spot welding system according to claim 1, wherein the drive part is a servomotor,
  the position detection part configured to detect the position of the movable arm by measuring a rotational position of the servomotor.

3. The spot welding system according to claim 1, wherein the processor is programmed to, in the first spring constant calculation step, calculate the combined spring constant, based on a first position when the movable arm is driven by a first drive force, and on a second position when the movable arm is driven by a second drive force.

4. The spot welding system according to claim 3, wherein when the first drive force is substantially zero, the movable electrode tip contacts the fixed electrode tip without applying a pressure on the fixed electrode tip when the movable arm is arranged at the first position.

5. The spot welding system according to claim 1, wherein the processor is programmed to, in the second spring constant calculation step, calculate the spring constant of the movable arm, based on a third position when the movable arm is driven by a third drive force, and on a fourth position when the movable arm is driven by a fourth drive force.

6. The spot welding system according to claim 5, wherein when the third drive force is substantially zero, the movable electrode tip contacts the reference fixed object without applying a pressure on the reference fixed object when the movable arm is arranged on the third position.

7. The spot welding system according to claim 1, further comprising the manipulator to which the spot welding gun is attached, wherein the processor is programmed to, in the second spring constant calculation step, calculate the spring constant of the movable arm with taking a spring constant of the manipulator into consideration.

8. A spot welding method comprising:
  a first pressing step of driving a movable arm of a spot welding gun by a predetermined drive force, and pressing a movable electrode tip supported by the movable arm against a fixed electrode tip supported by a fixed arm of the spot welding gun;
  a first position detection step of detecting a position of the movable arm at the first pressing step;

a first spring constant calculation step of calculating a combined spring constant of the movable arm and the fixed arm, based on the position detected at the first position detection step, and on the drive force applied to the movable arm at the first pressing step;

a second pressing step of driving the movable arm by a predetermined drive force, and pressing the movable electrode tip against a reference fixed object provided separate from the spot welding gun;

a second position detection step of detecting a position of the movable arm at the second pressing step;

a second spring constant calculation step of calculating a spring constant of the movable arm, based on the position detected at the second position detection step, and on the drive force applied to the movable arm at the second pressing step;

a third spring constant calculation step of calculating a spring constant of the fixed arm based on the combined spring constant and on the spring constant of the movable arm;

a workpiece holding step of driving the movable arm by a predetermined drive force, and holding a workpiece to be welded between the movable electrode tip and the fixed electrode tip;

a displacement calculation step of calculating an amount of elastic displacement of the fixed arm generated at the workpiece holding step, based on the spring constant of the fixed arm, and on the drive force applied to the movable arm at the workpiece holding step; and a position correction step of operating a manipulator to which the spot welding gun is attached, and correcting a position of the spot welding gun based on the amount of elastic displacement, wherein the first spring constant calculation step, the second spring constant calculation step, the third spring constant calculation step, and the displacement calculation step are performed by a controller comprising a processor.

* * * * *